United States Patent [19]

Tanaka et al.

[11] Patent Number: 5,029,770
[45] Date of Patent: Jul. 9, 1991

[54] WEBBING RETRACTOR

[75] Inventors: Kohbun Tanaka; Yuji Nishimura, both of Niwa; Masakazu Hashimoto, Okazaki; Toshihito Miyagawa, Toyota, all of Japan

[73] Assignee: Kabushiki Kaisha Tokai-Rika-Denki-Seishakusho, Aichi, Japan

[21] Appl. No.: 413,691

[22] Filed: Sep. 28, 1989

[30] Foreign Application Priority Data

Sep. 30, 1988 [JP] Japan .............. 63-128096[U]

[51] Int. Cl.⁵ .......................................... B65H 75/48
[52] U.S. Cl. ........................ 242/107.2; 242/107.4 R; 242/107.4 C
[58] Field of Search ............ 242/107.4 R, 107.2, 242/107.4 A, 107, 107.4 C

[56] References Cited

U.S. PATENT DOCUMENTS

| | | | |
|---|---|---|---|
| 3,695,545 | 10/1972 | Peters | 242/107.4 A |
| 3,984,063 | 10/1976 | Knieriemen | 242/107.4 R X |
| 4,162,772 | 7/1979 | Shimogawa et al. | 242/107.4 R X |
| 4,211,377 | 7/1980 | Yasumatsu | 242/107.2 |
| 4,213,580 | 7/1980 | Kawaharazaki et al. | 242/107.4 R X |
| 4,301,977 | 11/1981 | Yang | 242/107 |
| 4,310,128 | 1/1982 | Morita et al. | 242/107.4 R X |
| 4,323,204 | 4/1982 | Takada | 242/107.2 |
| 4,383,658 | 5/1983 | Morita et al. | 242/107 |
| 4,640,472 | 2/1987 | Epple | 242/107 |
| 4,667,894 | 5/1987 | Izuchi et al. | 242/107.2 X |
| 4,687,253 | 8/1987 | Ernst et al. | 242/107.2 X |
| 4,726,537 | 2/1988 | Escaravage | 242/107 |

FOREIGN PATENT DOCUMENTS 61-205532 9/1986 Japan .

Primary Examiner—Daniel P. Stodola
Assistant Examiner—John P. Darling
Attorney, Agent, or Firm—Oliff & Berridge

[57] ABSTRACT

A webbing retractor wherein a take-up shaft supporting a webbing worn by a seat occupant of a vehicle is rotated in a webbing taking-up direction by an urging force of a take-up mechanism connected to the take-up shaft. The rotation of the take-up shaft in a webbing drawing-out direction is stopped upon detection of a predetermined acceleration of the vehicle, whereupon the take-up shaft is moved by the webbing drawing-out force to lock an intermediate portion of the webbing drawn out from the take-up shaft. The take-up shaft and the take-up mechanism are connected together via a pair of mutually meshing gears. One of the gears is moved together with the take-up shaft in a state in which its engagement with the other gear is maintained when the take-up shaft is moved. Accordingly, the take-up mechansim is not moved when the take-up shaft is moved.

15 Claims, 14 Drawing Sheets

WEBBING RETRACTOR

BACKGROUND OF THE INVENTION

1. Field of the Invention

The present invention relates to a webbing retractor for taking up a webbing of a seat occupant of a vehicle.

2. Description of the Related Art

Among webbing retractors, there is a type in which when the rotation of a webbing take-up shaft for drawing out a webbing is stopped upon detection of a predetermined acceleration. The take-up shaft receives the webbing-drawing-out force and moves. At that time a spool fixed to the take-up shaft actuates a clamping means. The clamping means clamps an intermediate portion of the webbing so as to prevent the drawing-out of the webbing (Japanese Patent Laid-Open No. 205532/1986).

Since with this retractor an intermediate portion of the webbing is clamped and locked, the webbing taken up by the webbing take-up shaft does not become tightly wound, and the amount of pay out of the webbing after being locked is limited.

However, with this retractor, since the clamping means is actuated as the take-up shaft moves, an inner end of a spiral spring, which is an output portion of the take-up means, moves together with the take-up shaft. Accordingly, if an arrangement is adopted in which a tension reducer for reducing the tension of the webbing after the seat occupant secures the webbing and other related devices are provided on the take-up shaft, it is necessary for these devices to also move together with the take-up shaft. Hence, designing becomes extremely difficult.

SUMMARY OF THE INVENTION

Accordingly, an object of the present invention is to provide a webbing retractor which does not require an output portion of a webbing take-up means to move even when an intermediate portion of a webbing is clamped as in the case of a webbing retractor of a type in which the intermediate portion of the webbing is clamped and locked, thereby overcoming the above-described drawback of the conventional art.

To this end, according to the present invention, there is provided a webbing retractor comprising: a take-up shaft by which one end of a webbing for a seat occupant of a vehicle is supported and which is rotatable in the direction of taking up or drawing out the webbing; take-up means for imparting a rotation force to the take-up shaft in the take-up direction; a plurality of gears which are interposed between the take-up shaft and an output portion of the rotating force of the take-up means and which are set in a meshing state to transmit the rotating force of the take-up means to the take-up shaft; rotation prohibiting means for prohibiting the rotation of the take-up shaft in the drawing-out direction upon detection of an acceleration of the vehicle; clamping means for clamping and locking a longitudinal intermediate portion of the webbing drawn out from the take-up shaft upon being actuated; and guiding means which is adapted to move one of the plurality of gears in a predetermined direction together with the take-up shaft while maintaining the meshing state through the tension of the webbing, thereby actuating the clamping means when the rotation of the take-up shaft is prohibited by the rotation prohibiting means.

Accordingly, in accordance with the present invention, when the rotation prohibiting means detects an acceleration of the vehicle and prohibits the rotation of the take-up shaft and the drawing out of the webbing, the take-up shaft is moved along the guiding means by means of the tension applied to the webbing which is being drawn out from the take-up shaft. The clamping means is then actuated by the take-up shaft to clamp and lock an intermediate portion of the webbing. Accordingly, since tension is not applied to the webbing taken up by the take-up shaft in the form of layers, a further paying out of the webbing is suppressed. In addition, since the guiding means is moved together with the take-up means while engagement of the take-up means with one of the plurality of gears interposed between an output portion of the take-up means and the take-up shaft is being maintained, the relative movement of the take-up shaft and the take-up means is absorbed by the relative movement of these gears, so that the axis of the output portion of the take-up means is not moved, making it unnecessary for the take-up means to move.

The above and other objects, features and advantages of the present invention will become apparent from the following detailed description of the invention when read in conjunction with the accompanying drawings.

DESCRIPTION OF THE PREFERRED EMBODIMENTS

A description will now be given of the preferred embodiments of the present invention with reference to the accompanying drawings.

Overall Structure

Figure 1:
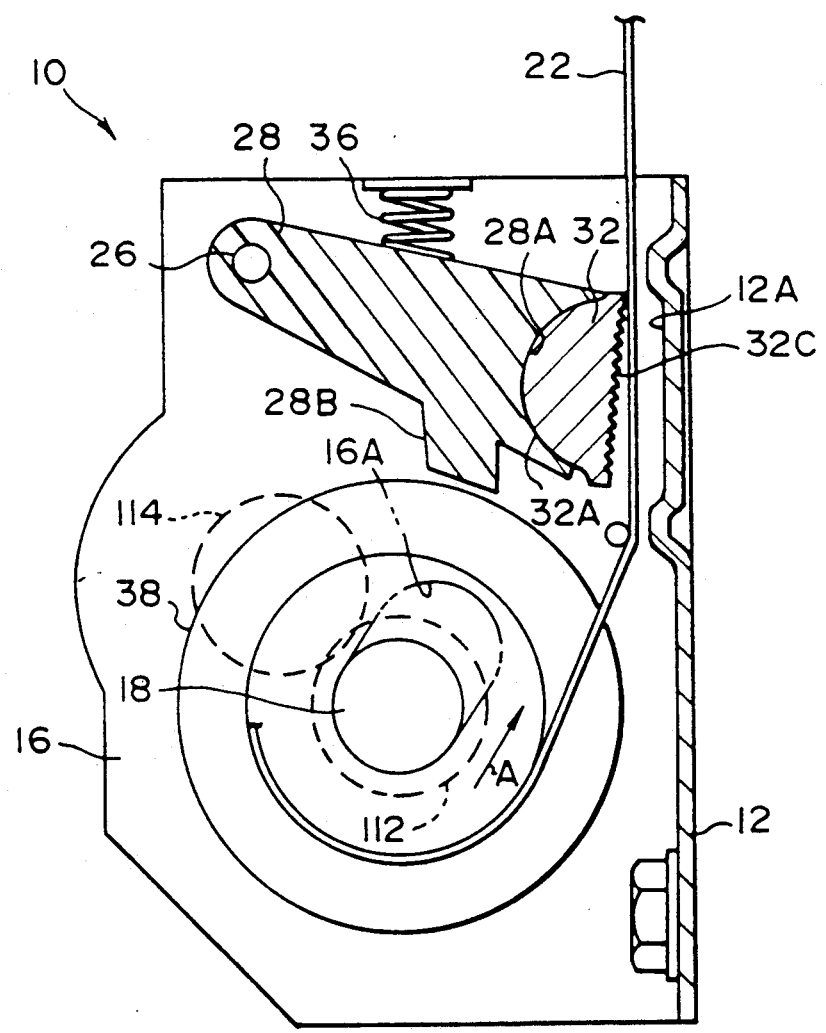
FIG. 1 is a cross-sectional view illustration a webbing retractor in accordance with a first embodiment of the present invention.
Figure 2:
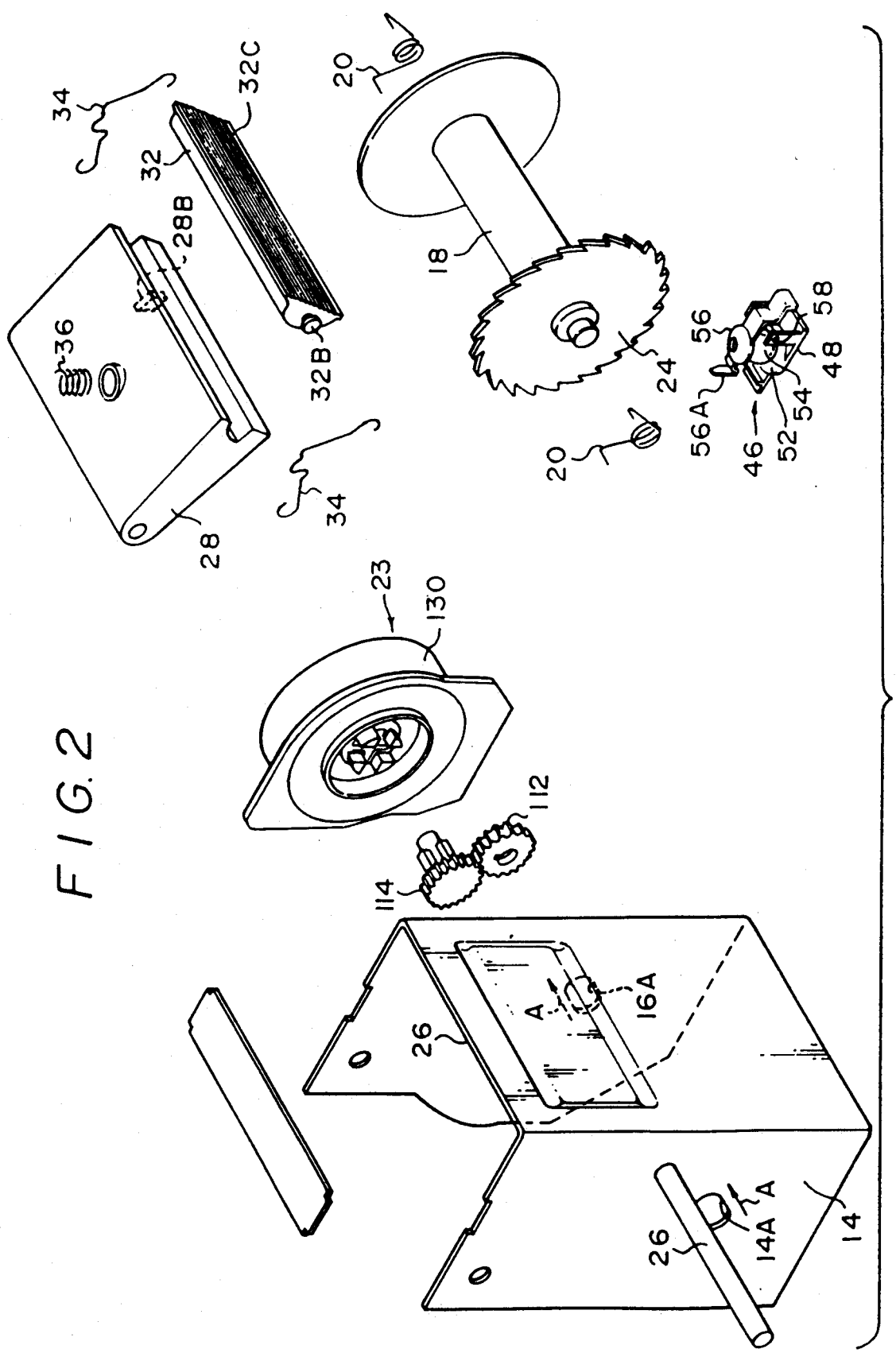
FIG. 2 is an exploded perspective view illustrating essential portions of the retractor.

FIGS. 1 and 2 illustrate a webbing retractor 10 to which the present invention is applied.

With this webbing retractor 10, a frame 12, which is secured to a chassis, has a pair of leg plates 14, 16 extending from opposite sides of and perpendicular to the frame 12 and in parallel to each other. The pair of leg plates 14, 16 are adapted to axially support portions of a take-up shaft 18 in the vicinity of the ends thereof. As for axially supporting the structure of this take-up shaft 18, elongated holes 14A, 16A are respectively formed in the leg plates 14, 16. The take-up shaft 18 is urged in the direction of one end of each elongated hole 14A, 16A by a pair of torsion coil springs 20 axially supported by the respective leg plates 14, 16.

One end of a webbing 22 is taken up in the form of layers by an axially intermediate portion of the take-up shaft 18. The take-up shaft 18 is subjected to a rotating force in a webbing taking-up direction by an urging force of a take-up means 23 attached to the outer side of the leg plate 16. However, when the tension acting on the webbing 22 becomes large, the take-up shaft 18 is adapted to move in the direction of the other end of each elongated hole 14A, 16A (in the direction of arrow A) against the urging force of the torsion coil springs 20.

Secured to one end of the take-up shaft 18 is a ratchet wheel 24 which corresponds to an acceleration sensor 46 fixed to the frame 12. A bracket 48 of the acceleration sensor 46 is secured to the frame 12. A sensor ball 54 is accommodated in a saucer-shaped receiver 52 formed integrally with the bracket 48. A cap 56 is axially supported at one of its ends to bracket 48 by a pin 58.

A pawl 56A projecting from the cap 56 corresponds to an outer periphery of the ratchet wheel 24. The arrangement is such that when the acceleration of the vehicle reaches a predetermined value, the sensor ball 54 moves in the saucer-shaped receiver 52 and is raised, so that the pawl 56A engages with the ratchet wheel 24, thereby stopping the webbing drawing out rotation of the take-up shaft 18.

Consequently, when the webbing 22 is drawn out toward the occupant, the take-up shaft 18 whose rotation has been stopped is adapted to move in the direction of arrow A inside the elongated holes 14A, 16A due to the increased tension of the webbing 22. It should be noted that a part of the pawl 56A is arranged to be capable of undergoing elastic deformation as the take-up shaft 18 moves in the direction of arrow A.

Structure of the Clamping Means

A clamping lever 28 is axially supported to leg plates 14, 16 via a pin 26. A recess 28A is formed in a tip end of this clamping lever 28, and a clamping plate 32 is accommodated therein. The clamping plate 32 has a protrusion 32A formed on one side thereof. The protrusion 32A is accommodated in the recess 28A. Formed on opposite sides of clamping plate 32 are pins 32B. One end of a wire spring 34 is attached to one pin 32B while the other wire spring 34 is attached to the other pin 32B. The other end of each wire spring 34 is fixed to the pin 26, thereby allowing the clamping plate 32 to be held by the clamping lever 28.

The clamping plate 32 is subjected to an urging force of a compression coil spring 36 and is hence urged clockwise as viewed in FIG. 1. However, when the clamping plate 32 rotates counterclockwise, a corrugated portion 32C, formed on the side which is remote from the side where the protrusion 32A is formed, clamps an intermediate portion of the webbing 22. A stepped portion 12A, formed on the frame 12, thereby prevents the webbing 22 from moving in the direction of the occupant.

The clamping lever 28 is actuated by a disk 38 secured to the take-up shaft 18 in such a manner as to oppose the ratchet wheel 24. In other words, when the rotation of the take-up shaft 18 for drawing out the webbing is stopped, and the take-up shaft 18 moves in the direction of arrow A along the elongated holes 14A, 16A with an increase in the tension of the webbing 22, the disk 38 is brought into contact with a projection 28B projecting from the clamping lever 28, hence causing the clamping lever 28 to rotate counterclockwise, thereby clamping an intermediate portion of the webbing 22.

Structure of the Take-up Means 23

When the webbing is worn by the occupant, the take-up means 23 has a function to reduce the tension of the webbing, as will be described below.

Figure 3:
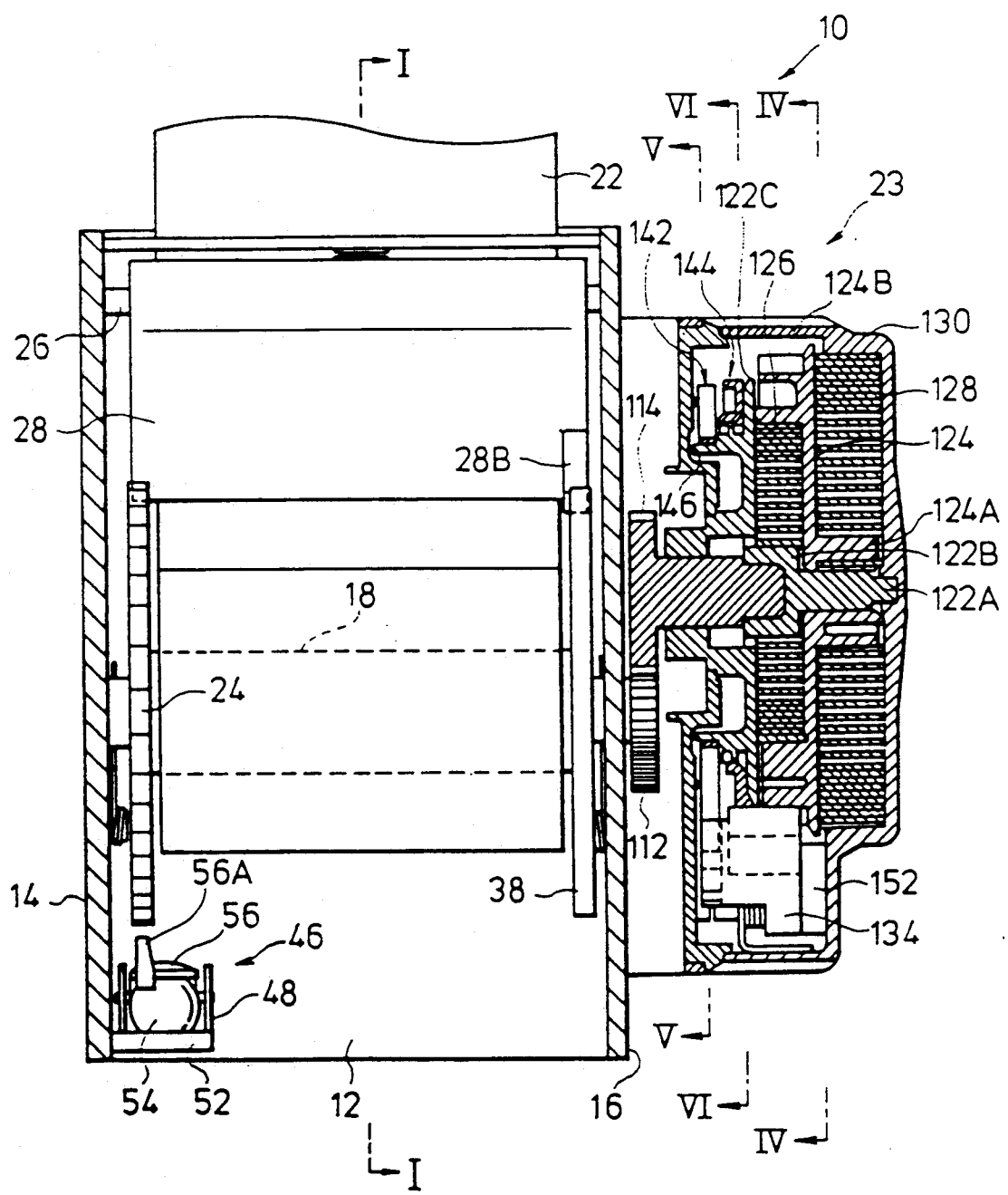
FIG. 3 is a right side elevational view, partly in section, of the webbing retractor shown in FIG. 1.
Figure 4:
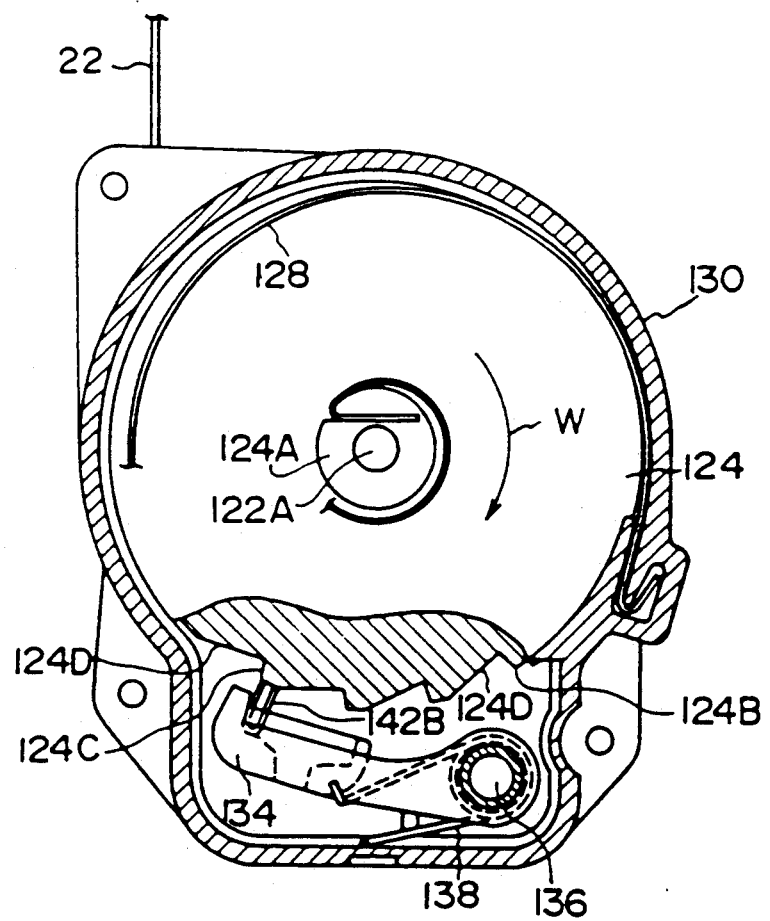
FIG. 4 is a cross-sectional view taken along line IV—IV of FIG. 3.
Figure 10:
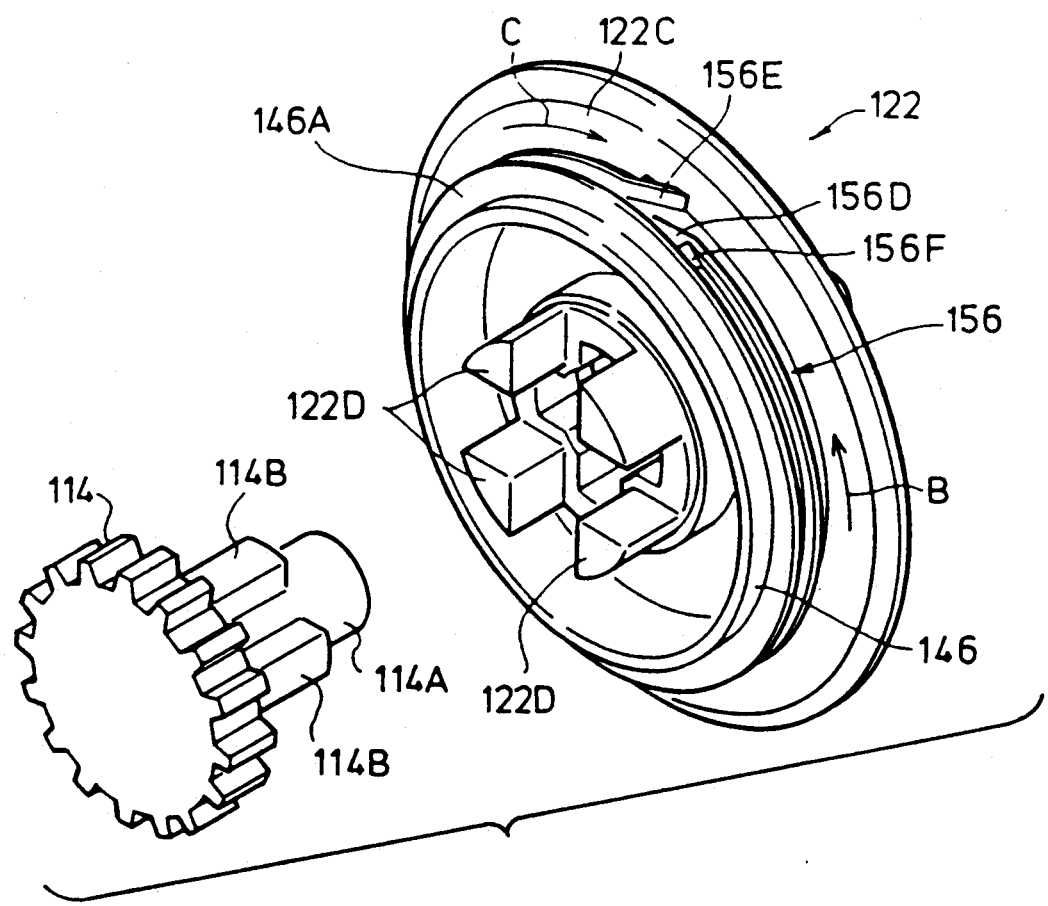
FIG. 10 is a perspective view of a connecting wheel.

A gear 112, shown in FIG. 2, is coaxially secured to the take-up shaft 18 and is adapted to rotate with the take-up shaft 18. As shown in FIG. 10, this gear 112 meshes with a gear 114 and projections 114B of a shaft 114A projecting from the gear 114 are engaged with projections 122D of a connecting wheel 122, thereby allowing the gear 114 to be coaxially connected to the connecting wheel 122. As shown in FIGS. 3 and 4, this connecting wheel 122 has an axially projecting small-diameter portion 122A which axially supports a ratchet wheel 124. Retained on an inner peripheral surface of this ratchet wheel 124 is an outer end of a small spiral spring 126 which is a first resilient member. An inner end of this small spiral spring 126 is retained by a spring-retaining portion 122B located adjacent to the small-diameter portion 122A.

In addition, retained at a boss 124A of the ratchet wheel 124 is an inner end of a large spiral spring 128 which is a second resilient member. This large spiral spring 128 has a greater urging force than the small spiral spring 126, an outer end thereof being retained by a cover 130 fixed to the leg plate 16. The large spiral spring 128 is supported by the frame 12 via the cover 130.

Accordingly, the urging forces of the small and large spiral springs 126, 128 connected in series via the ratchet wheel 124 are transmitted to the take-up shaft 18 by being reversed by the gears 114, 112, thereby rotating the take-up shaft in the webbing take-up direction (in the opposite direction to arrow W in FIG. 4).

Figure 12:
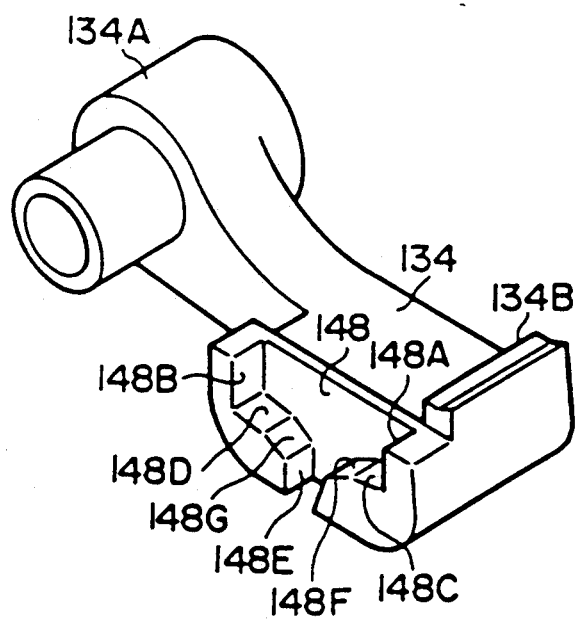
FIG. 12 is a perspective view of a pawl.

As shown in FIG. 4, a pawl 134 corresponds to an outer periphery of ratchet teeth 124B of the ratchet wheel 124. As shown in FIG. 12, this pawl 134 has a boss 134A. The boss 134A is axially supported by a shaft 136 projecting from the cover 130. As shown in FIG. 8 the arrangement is such that when a projection 134B, projecting from a distal end of the pawl 134, is engaged with the ratchet teeth 124B, the ratchet wheel 124 is prevented from rotating in the direction of arrow W (clockwise as viewed in FIGS. 7 and 8) so that the urging force of the large spiral spring 128 is not transmitted to the take-up shaft 18. Only the small urging force of the small spiral spring 126 is transmitted to the take-up shaft 18, thereby obtaining a state in which the take-up force is reduced. In consequence, the torsion coil spring 138 disposed around the outer periphery of the boss 134A has its opposite ends extending engagingly between the cover 130 and the pawl 134, respectively. Thus, the torsion coil spring 138 produces an urging force in the direction in which the projection 134B of the pawl 134 is allowed to engage with the ratchet wheel 124.

To control the engagement and disengagement of the pawl 134 and the ratchet wheel 124, a friction spring 142, i.e., a frictionally rotating means, and a cam plate 144, i.e., a cam plate 144, are provided.

Figure 5:
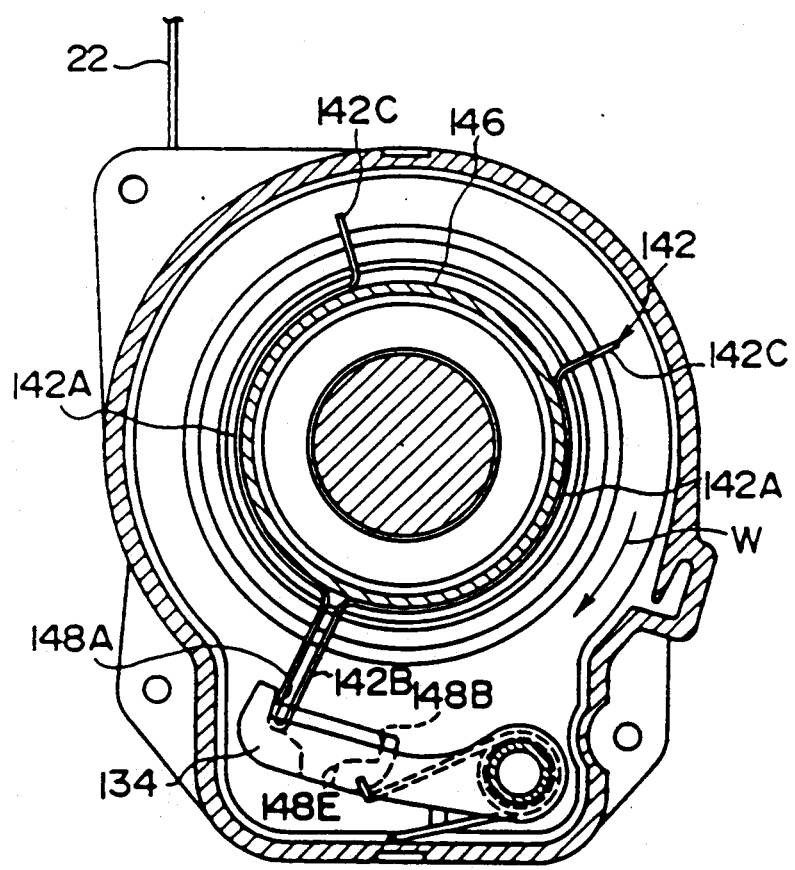
FIG. 5 is a cross-sectional view taken along line V—V of FIG. 3.

As shown in FIG. 5, the friction spring 142 is arranged such that a pair of intermediate portions 142A is brought into contact with an outer periphery of a cylindrical portion 146 of the connecting wheel 122 so as to receive the rotation of the connecting wheel 122 via a frictional force. A substantially U-shaped arm 142B projects outwardly between the inner ends of the intermediate portions 142A in such a manner as to correspond to the pawl 134. This arm 142B is inserted into a groove 148 formed in the vicinity of the distal end of the pawl 134.

Figure 6:
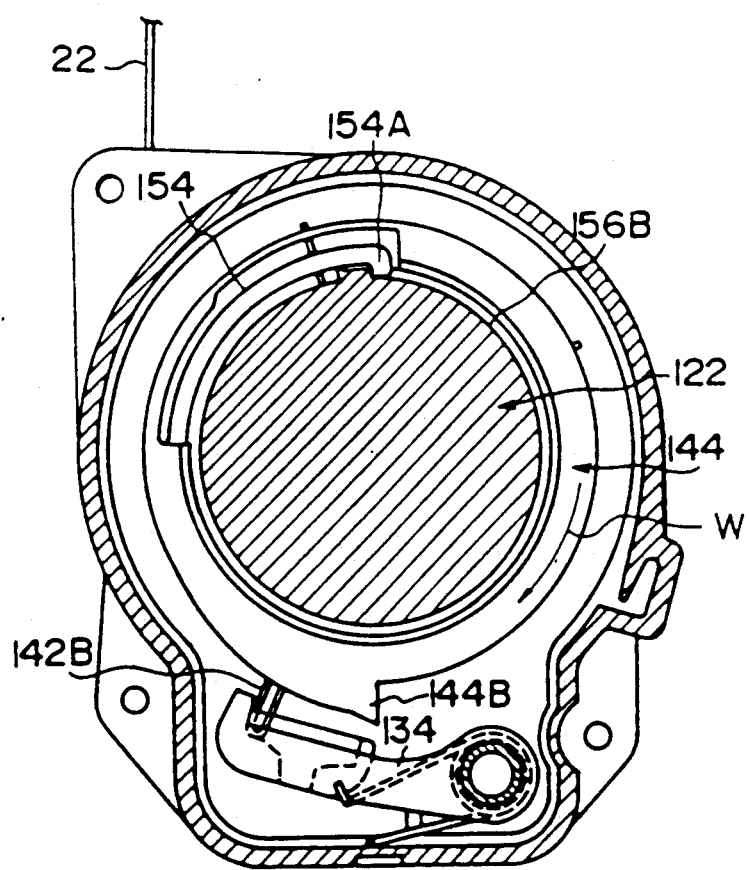
FIG. 6 is a cross-sectional view taken along line VI—VI of FIG. 3.
Figure 7:
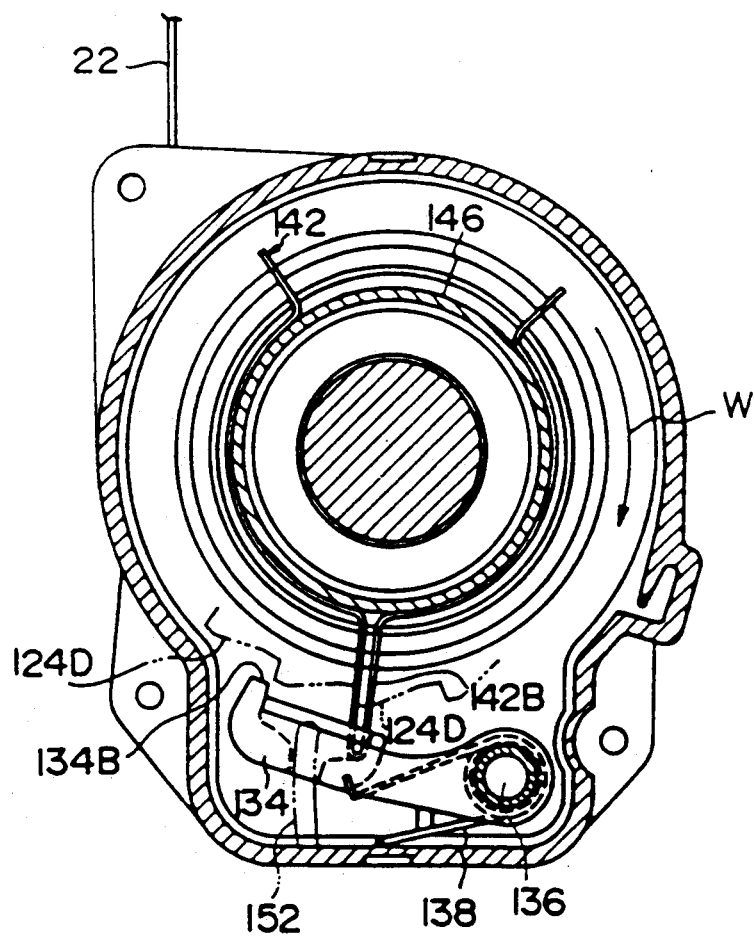
FIGS. 7 and 8 are operational diagrams of FIG. 4.
Figure 8:
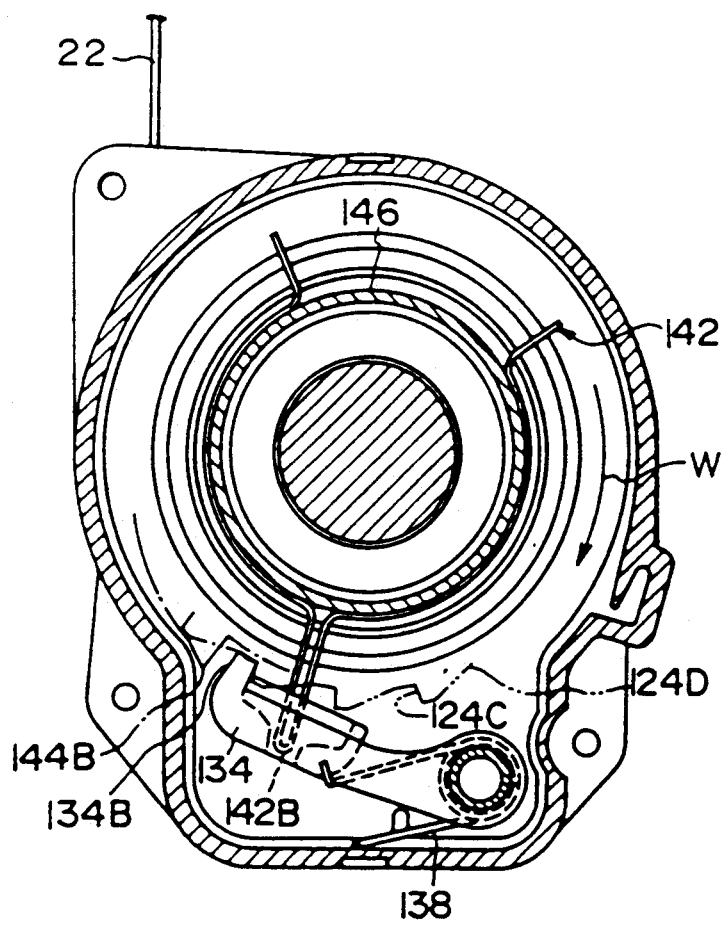

As shown in FIGS. 5 and 7, the groove 148 permits the arm 142B to rotate until it is brought into contact with side walls 148A, 148B of the groove 148. In other words, since the rotating direction of the take-up shaft 18 and the rotating direction of the connecting wheel 122 (FIG. 6) are opposite to each other, the arm 142B is brought into contact with the side wall 148A by the rotation of the take-up shaft 18 in the webbing take-up direction (in the opposite direction of arrow W in FIG. 5) and is brought into contact with the side wall 148B by the rotation thereof in the webbing-drawout direction (in the direction of arrow W in FIG. 7). As a result, the rotation of the friction spring 142 is restricted, thereby causing the intermediate portions 142A of the friction spring 142 to slide relative to the cylindrical portion 146 of the connecting wheel 122. In a state in which the arm 142B abuts the side wall 148A, the distal end of the arm 142B corresponds to a bottom wall 148C of the groove 148. In a state in which the arm 142B abuts the side wall 148B, the distal end thereof corresponds to a bottom wall 148D, thereby preventing the pawl 134 from engaging with the ratchet wheel 124. However, the depth of the groove 148 is different between the bottom walls 148C and 148D so that in the state in which the arm 142B corresponds to the bottom wall 148D, the pawl 134 rotates clockwise as viewed in FIG. 7 by a slight amount more than in the state in which the arm 142B corresponds to the bottom wall 148C, causing the projection 134B to approach the outer periphery of the ratchet wheel 124.

As shown in FIG. 12, a notch 148E is formed between the bottom walls 148C and 148D. As shown in FIG. 8, a friction spring 142 can be inserted into this notch 148E. In this case, since the arm 142B does not restrict the rotation of the pawl 134, the protrusion 134B on pawl 134 can engage with one of the ratchet teeth 124B. Chamfered portions 148F, 148G are formed at the ends of the bottom walls 148C and 148D and on the sides of notch 148E.

A guide rib 152 projecting from the cover 130 and formed longitudinally around the axis of the shaft 136 corresponds to the opposite side surface of the pawl 134, and serves to prevent the rattling of the pawl 134. FIG. 5 shows that the friction spring 142 also has a pair of arms 142C formed at the ends that are remote from the arm 142B of the intermediate portions 142A and project radially from the cylindrical portion 146. The arms 142C are used for gripping at the time when the friction spring 142 is installed.

Figure 9:
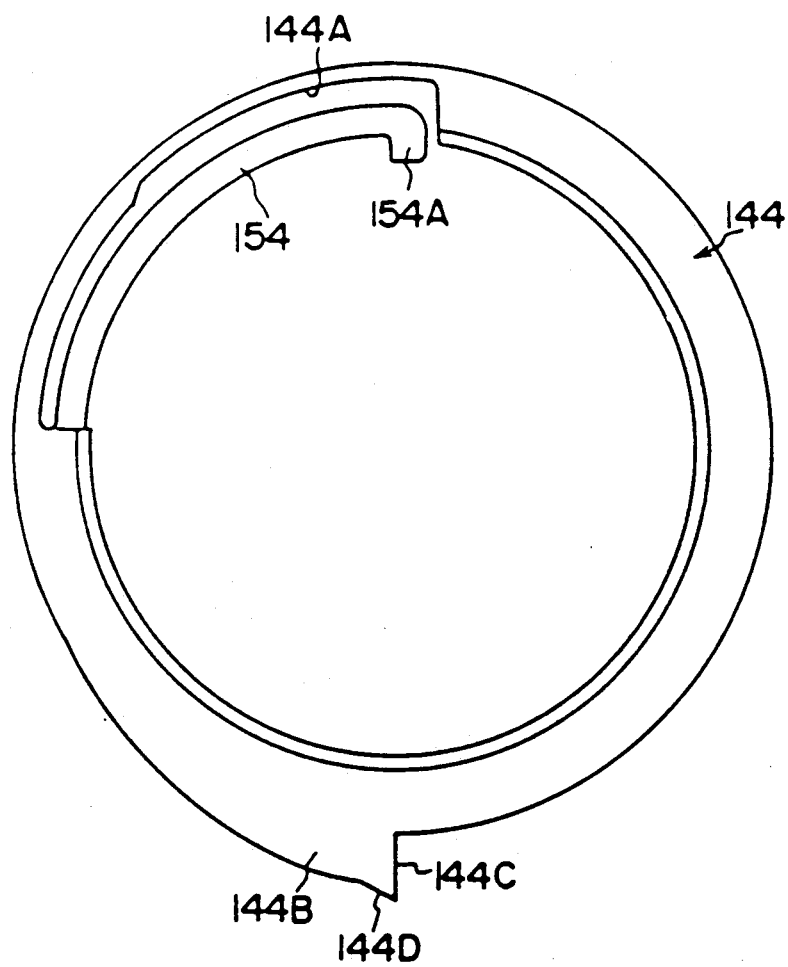
FIG. 9 is a front elevational view illustrating a cam plate.

As shown in FIG. 9, the cam plate 144 has a hollow annular configuration. As shown in FIG. 3, the cam plate 144 is arranged such that it is interposed between the friction spring 142 and a collar 122C of the connecting wheel 122. Its inner periphery is supported toward an outer periphery of a large-diameter cylinder 146A located between the cylindrical portion 146 and the collar 122C, thereby allowing the cam plate 144 to rotate relatively with the connecting wheel 122. As shown in FIG. 9, cam plate 144 has a notch 144A formed in its inner peripheral portion for about one-third of its circumference. It also has a force-receiving arm 154 formed integrally therewith and projecting into the notch 144A. This force-receiving arm 154 has its proximal end connected to one end of the notch 144A and extends along the notch 144A in an arcuate configuration. Its distal end is formed as a projection 154A bent in the direction of the axis of the cam plate 144, and is inserted into a groove 156 formed in an outer periphery of the large-diameter cylinder 146A.

Figure 11:
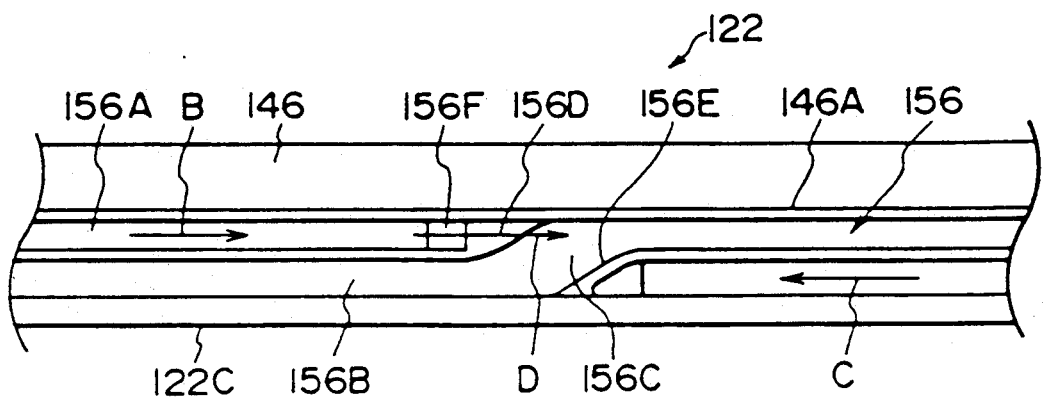
FIG. 11 is a top plan view of a development of the configuration of a groove of the connecting wheel.

As shown in FIGS. 10 and 11, groove 156 is formed on the outer periphery of the connecting wheel 122 and has a first groove 156A and a second groove 156B whose axes are formed within a plane perpendicular to the axis of the connecting wheel. The arrangement is such that one end of each of the first and second grooves 156A, 156B communicates with an inclined groove 156C which is inclined relative to the plane perpendicular to the axis of the connecting wheel 122. As a result, the groove 156 is formed as a spiral groove having about two turns.

Although in this embodiment the first and second grooves 156A, 156B are provided with inclined groove 156C and actually a spiral groove is thus formed, it is possible to adopt a spiral groove in the form of a threaded groove in which the first and second grooves are inclined relative to a plane perpendicular to the axis of the cam plate.

Ends of the first and second grooves 156A, 156B that are opposite to the inclined groove 156C are respectively formed as walls 156D, 156E. A part of the wall 156D is formed as an inclined surface 156F which makes the depth of the first groove 156A gradually shallower. Consequently, as shown in FIG. 11, the projection 154A of the force-receiving arm 154 of the cam plate 144 which enters this groove 156 moves in the direction of arrow B at the time of drawing out the webbing, and is adapted to re-enter the inclined groove 156C after riding up over the wall 156D in the direction of arrow D at the end of the first groove 156A. Incidentally, the wall 156D is set to be lower than the large-diameter cylinder 146A to allow the projection 154A of the force-receiving arm 154 to be securely guided in the direction of arrow D.

As viewed in FIG. 9, the force-receiving arm 154 is capable of undergoing resilient deformation in the axial direction i.e., in a direction, of moving toward and separating from the axis and in a direction parallel with the axis (perpendicular to side surface of the cam plate 144). As a result, the projection 154A of the force-receiving arm 154 is capable of moving to the first groove 156A and then to the second groove 156B via the inclined groove 156C, and of moving in the direction of arrow D in FIG. 11 by riding up over the wall 156D. Arrow B in FIG. 11 shows the direction of movement of the projection 154A of the force-receiving arm 154 at the time of drawing out the webbing. C shows the direction of movement thereof at the time of taking up the webbing. It should be noted that four projections 122D shown in FIG. 10 are used for connecting the connecting wheel 122 to the take-up shaft 18.

A substantially triangular cam projection 144B projects from a part of an outer periphery of the cam plate 144. This cam projection 144B has a vertical wall 144C and an inclined wall 144D. As viewed in FIG. 7, when the pawl 134 is in engagement with the ratchet wheel 124, and rotates clockwise the inclined wall 144D is adapted to cause the pawl 134 to disengage from the ratchet wheel 124 in correspondence with the projection 134B of the pawl 134.

Operation of the Embodiment

FIG. 6 illustrates a state in which the webbing 22 is not being worn by the occupant and is being fully accommodated and wound up. In this state, the arm 142B corresponds to the bottom wall 148C of the pawl 134 and separates the pawl 134 from the ratchet wheel 124. In addition, the cam plate 144 is not located at any predetermined position.

As viewed in FIG. 6, when the occupant draws out the webbing 22 to wear the same, the take-up shaft 18 rotates clockwise (in the direction of arrow W), while the connecting wheel 122 rotates counterclockwise (in the opposite direction to arrow W) via the gears 112, 114. Consequently, as for the friction spring 142, its intermediate portions 142A are subjected to a frictional force exerted from the cylindrical portion 146, so that the friction spring 142 rotates counterclockwise. As a result, the distal end of the arm 142B corresponds to the notch 148E in the pawl 134. Hence, the projection 134B of the pawl 134 is brought into contact with the ratchet wheel 124 by the urging force of the torsion coil spring 138. However, as the webbing 22 continues to be subjected to the tensile force, the projection 134B of the pawl 134 is pushed upward to the inclined surface 124D of the ratchet wheel 124. Accordingly, as viewed in FIG. 6, the arm 142B of the friction spring 142 being subjected to a counterclockwise rotating force then moves to the bottom wall 148D, thereby maintaining the pawl 134 in disengagement from the ratchet wheel 124, as shown in FIG. 7. Subsequently, when the webbing 22 is further drawn out, the intermediate portions 142A of the friction spring 142 rotate relative to the cylindrical portion 146, so that the friction spring 142 stops with the arm 142B abutting the side wall 148B. In addition, the cam plate 144 receives the counterclockwise rotation of the connecting wheel through a frictional force, rotates with a weak rotating force in the counterclockwise direction, and stops with its vertical wall 144C abutting the projection 134B of the pawl 134. Consequently, if the webbing 22 is further drawn out, the projection 154A of the force receiving arm 154 of the cam plate 144 continues to move relatively through the first groove 156A of the connecting wheel 122 in the direction of arrows B, D in FIG. 11.

After the occupant has fully drawn out the webbing 22, and if the occupant wears the webbing 22 by engaging a tongue plate with a buckle device (neither are shown), an excessively drawn out portion of the webbing 22 is taken up by the urging forces of the small and large spiral springs 126, 128 until the webbing 22 is brought into close contact with the body of the occupant. As a result, the take-up shaft 18 rotates counterclockwise as viewed in FIG. 7, while the connecting wheel 122 rotates clockwise about one turn via the gears 112, 114.

Accordingly, the arm 142B of the friction spring 142 which receives this rotation through a frictional force exerted from the cylindrical portion 146 corresponds to the notch 148E of the pawl 134, and the pawl 134 rotates clockwise by the urging force of the torsion coil spring 138. This causes the projection 134B to engage with the ratchet wheel 124, as shown in FIG. 8. In consequence, the urging force of the large spiral spring 128 acting on the connecting wheel 122 and the take-up shaft 18 is hampered. Only the small spiral spring 126 exerts a weak taking-up force to the take-up shaft 18, with the result that a state of reduced tension is obtained. This alleviates an cumbersome sensation felt by the occupant.

When the webbing 22 is drawn out from the take-up shaft 18 as the occupant changes his or her driving position or the like, a reduced taking-up force state is maintained until the small spiral spring 126 is tightly wound. On the other hand, when the webbing 22 is retracted by the take-up shaft 18 due to a change in the driving posture, breathing by the occupant, or the like, the connecting wheel 122 rotates clockwise as viewed in FIG. 8. However, the projection 154A disposed in the groove 156 of the connecting wheel 122 does not receive the rotating force from the connecting wheel 122 until the projection 154A is brought into contact with the wall 156D after moving in the direction of arrow B as shown in FIG. 11. Immediately after a reduction of the take-up force, the cam projection 144B of the cam plate 144 is in the state shown in FIG. 8. The projection 154A of the force-receiving arm 154 is disposed in the first groove 156A. Accordingly, until the webbing 22 is taken up by the take-up shaft 18 and the projection 144B of the cam plate 144 pushes up the pawl 134, the take-up shaft 18 is capable of rotating a minimum of two turns and a maximum of about three turns although it varies depending on the stopping position of the cam plate 144. In a taking-up operation when the webbing 22 is worn by the occupant, this state of reduced tension is not canceled inadvertently.

In a normal running state of the vehicle, since the sensor ball 54 is disposed in the central and lowermost portion of the circular saucer-shaped receiver 52, the take-up shaft 18 is capable of rotating in the webbing taking-up direction. However, when the vehicle reaches a state in which a predetermined acceleration is exceeded, the sensor ball 54 rises up the inclined surface of the receiver 52, so that the pawl 56A is engaged with the ratchet wheel 24. In a state in which the vehicle is accelerating, the occupant moves in the direction of acceleration. This increases the tension on the webbing 22 for stopping it from being drawn out. Accordingly, the webbing 22 causes the take-up shaft 18 to move along the elongated holes 14A, 16A in the direction of arrow A. At the same time the disk 38 causes the clamping lever 28 to rotate counterclockwise, as viewed in FIG. 1, via the projection 28B. As a result, the clamping plate 32 clamps and locks an intermediate portion of the webbing 22 in cooperation with the stepped portion 12A.

In this case as well, as the gear 112 secured to one axial end of the take-up shaft 18 moves in the direction of arrow A, the take-up shaft 18 absorbs the relative movement of the take-up means 23 and the take-up shaft 18 while maintaining its engagement with the gear 114. Consequently, the take-up means 23 is not moved, so that designing can be greatly facilitated.

When the occupant disengages from the webbing 22, the webbing 22 is taken up by the take-up shaft 18 through the weak urging force of the small spiral spring 126. Accordingly, when this take-up is effected by a minimum of two turns and a maximum of about three turns, the projection 154A of the force-receiving arm 154 corresponds to the wall 156E, and the inclined wall 144D of the cam projection 144B pushes the projection 134B up, thereby disengaging the pawl 134 from the ratchet wheel 124, so that the ratchet wheel 124 becomes rotatable. As a result, the large urging force of the large spiral spring 128 is exerted on the take-up shaft 18, and the take-up shaft 18 takes up the webbing 22 through a strong force until the webbing 22 is fully taken up and accommodated.

It goes without saying that the present invention is applicable to cases where a structure for reducing the tension of a webbing other than the above-described structure is adopted.

Figure 13:
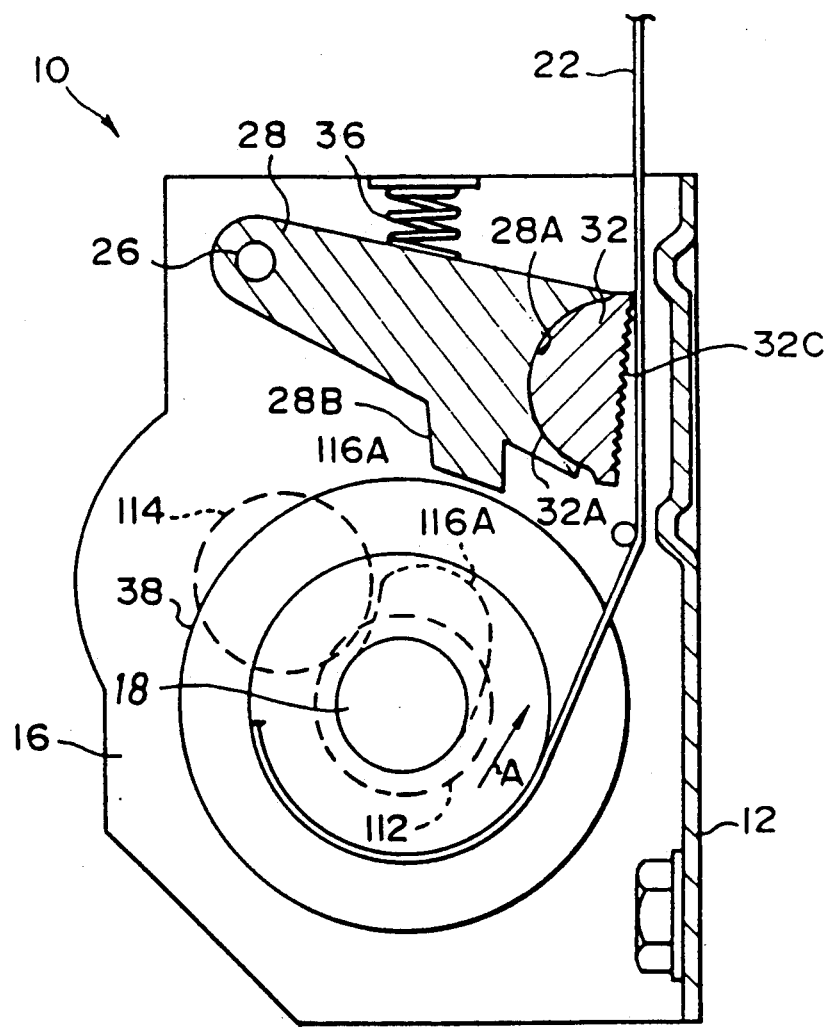
FIG. 13 is a cross-sectional view corresponding to FIG. 1 and illustrating a modification of the embodiment.
Figure 14:
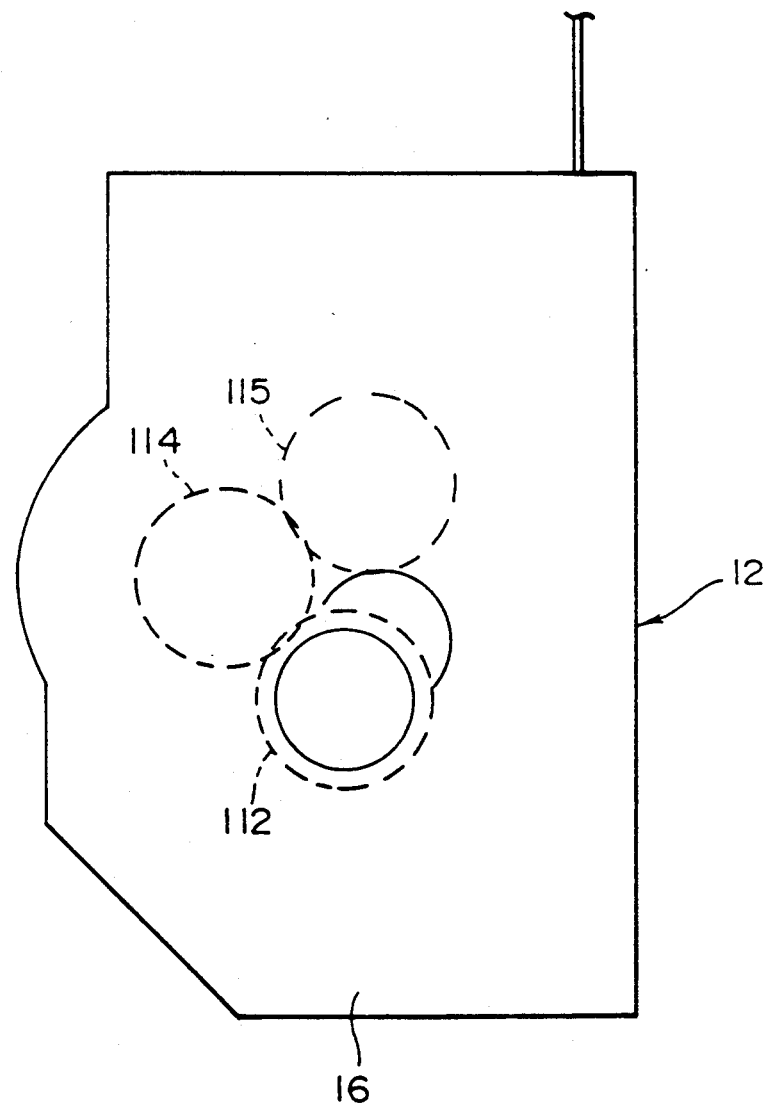
FIG. 14 is a perspective view of essential portions of another modification of the embodiment.

In addition, the take-up shaft 18 and the gear 112 are not confined to the arrangement in which they are moved rectilinearly in the direction of arrow A. They may be alternatively arranged to depict another moving path such as by causing them to undergo an arcuate motion by providing curved elongated holes 116A along the gear 114, as shown in FIG. 13.

Furthermore, an arrangement may be alternatively provided such that an idle gear 115 pivotally supported by the leg plate 16 of the frame 12 is interposed between the gears 112 and 114 so as to allow the transmission of the rotation between the gears 112 and 114 to be effected via the idle gear 115. In this arrangement, the direction of rotation of the take-up shaft 18 and that of the connecting wheel 122 become identical.

Figure 15:
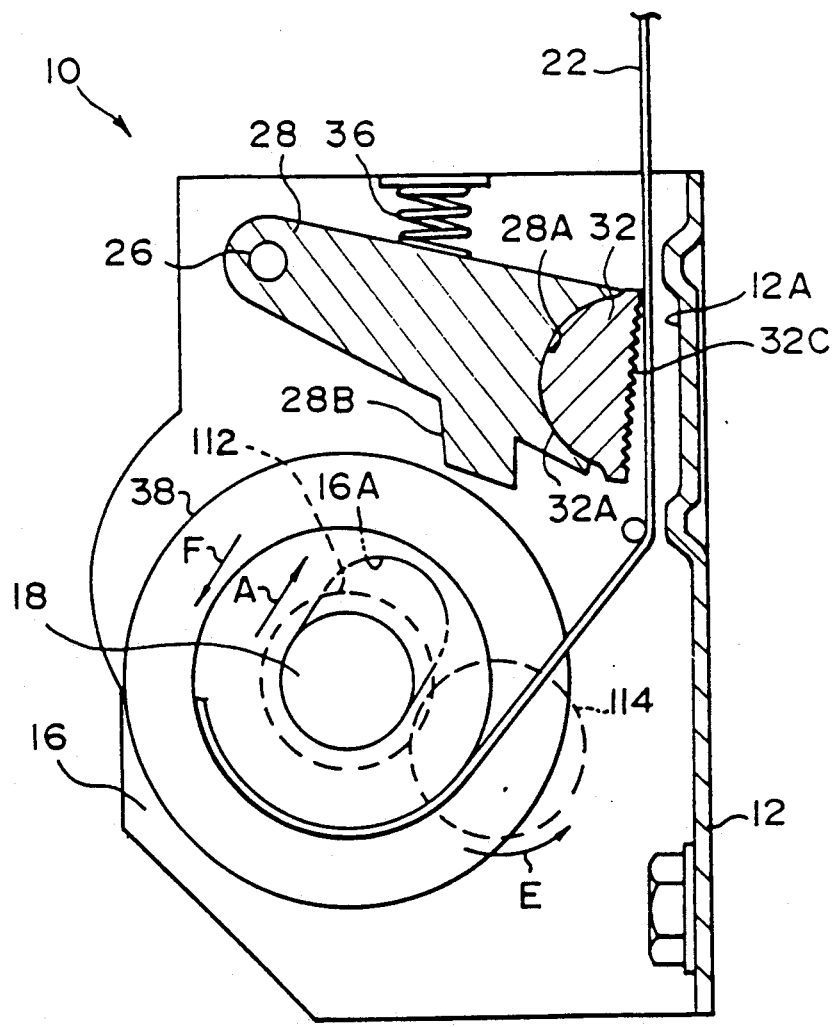
FIG. 15 is a sectional view corresponding to FIG. 1 and illustrating another modification of the embodiment.

Furthermore, as shown in FIG. 15, an arrangement may be alternatively provided such that the positional relationship between the take-up shaft 18, i.e., the gear 112, and the gear 114 is the reverse of that shown in FIG. 1.

In the case of this arrangement, the gear 114 is subjected to a rotating force in the direction of arrow E in FIG. 15 (counterclockwise) by the urging forces of the small spiral spring 126 and the large spiral spring 128, and this rotating force is transmitted to the gear 112, thereby urging the take-up shaft 18 in the webbing taking-up direction (clockwise). In addition, this taking-up force acts on the gear 112 and the take-up shaft 18 in the direction of arrow F, i.e., in the direction of pressing the same against the lower end portion of the elongated hole 16A (14A). Accordingly, even if the urging force of the large spiral spring 128 is strong, it is possible to prevent the occurrence of a case in which the take-up shaft 18 is moved inadvertently in the opposite direction of F and actuates the lever 28, causing the webbing 22 to be undesirably locked.

Although the foregoing embodiments have been described with respect to a retractor provided with a tension reducer mechanism, the present invention is not restricted to the same, and may also be applied to a retractor provided with a tension reliever mechanism whereby the tension of the webbing is prevented from acting on the occupant when the webbing is worn by the occupant.

In accordance with the present invention, by virtue of the above-described arrangement, the present invention offers an outstanding advantage in that it is unnecessary to move the take-up shaft even in the case of a type in which an intermediate portion of the webbing is clamped and locked.

What is claimed is:

1. A webbing retractor comprising:
    a take-up shaft having a pressing portion, and by which a longitudinal one end of a webbing for a seat occupant of a vehicle is supported and which is rotatable in the direction of taking up or drawing out said webbing;
    take-up means for imparting a rotating force to said take-up shaft in said take-up direction, said take-up means having an urging shaft;
    a gear train which is comprised of a first gear and a second gear and is interposed between said take-up shaft and said urging shaft of said take-up means, said first gear being mounted on said take-up shaft, said second gear being connected to said urging shaft, and both said gears being arranged in a meshing state to transmit said rotating force of said take-up means to said take-up shaft, said first gear being capable of rotating with said take-up shaft in meshing engagement with said second gear;
    rotation prohibiting means for prohibiting the rotation of said take-up shaft in said drawing-out direction upon detection of an acceleration of said vehicle;
    guiding means which is adapted to translationally move said first gear together with said take-up shaft in a predetermined direction while maintaining said meshing state between said first and second gears and while said take-up means and said second gear remain relatively translationally stationary, said translational movement caused by the tension of said webbing when the rotation of said take-up shaft is prohibited by said rotation prohibiting means; and
    clamping means for clamping and locking a longitudinally intermediate portion of said webbing drawn out from said take-up shaft by pushing said clamping means with said pressing portion of said take-up shaft.

2. A webbing retractor according to claim 1, further comprising an idle gear interposed between said first and second gears in meshing engagement with said two gears.

3. A webbing retractor according to claim 1, wherein said guiding means is arranged to move said take-up shaft rectilinearly.

4. A webbing retractor according to claim 1, wherein said guiding means is arranged to move said take-up shaft in a curved manner along a teeth portion of said second gear with which said first gear meshes.

5. A webbing retractor according to claim 1, wherein said guiding means has a pair of elongated holes in which portions of said take-up shaft in the vicinity of respective opposite ends thereof are respectively accommodated and which extend in said predetermined direction, and urging means for urging said take-up shaft in an opposite direction to said predetermined direction.

6. A webbing retractor according to claim 1, wherein said take-up means has a tension reducer mechanism for reducing the tension of said webbing after said webbing is applied to the occupant of said vehicle.

7. A webbing retractor according to claim 6, wherein said tension reducer mechanism includes a spiral spring connected in series to said output portion, the reduction of the tension of said webbing being effected by stopping part of an urging force of said spiral spring.

8. A webbing retractor for taking up a webbing applied to a seat occupant of a vehicle, comprising:

a take-up shaft by which one end of said webbing is supported, which is rotatable in a direction of taking up or drawing out said webbing and is additionally translationally movable in a predetermined direction, said take-up shaft having a pressing portion;

a first gear secured to one end of said take-up shaft concentrically with said take-up shaft;

take-up means including a first urging means having an urging shaft being stably rotatable and having a second gear meshing with said first gear and adapted to rotate in an urging manner said take-up shaft in said take-up direction via said second gear by means of an urging force;

rotation prohibiting means for prohibiting the rotation of said take-up shaft in said drawing-out direction upon detection of an acceleration of said vehicle;

locking means for locking a longitudinally intermediate portion of said webbing drawn out from said take-up shaft upon being actuated; and guiding means which is adapted to translationally move said first gear in said predetermined direction while maintaining a meshing state between said first gear and said second gear and while said take-up means and said second gear remain relatively translationally stationary, said translational movement caused by the tension of said webbing, said locking means being actuated when the rotation of said take-up shaft is prohibited by said rotation prohibiting means by pressing said locking means with said pressing portion of said take-up shaft when moving in said predetermined direction.

9. A webbing retractor according to claim 8, wherein said guiding means has a pair of elongated holes in which portions of said take-up shaft in the vicinity of respective opposite ends thereof are respectively accommodated and extend in said predetermined direction so as to guide said take-up shaft in said predetermined direction, and second urging means for urging said take-up shaft in an opposite direction to said predetermined direction.

10. A webbing retractor according to claim 9, wherein the extending direction of each of said elongated holes is rectilinear.

11. A webbing retractor according to claim 9, wherein the extending direction of each of said elongated holes is arcuate along an outer periphery of said second gear.

12. A webbing retractor according to claim 9, wherein each of said elongated holes is formed in a frame by which said take-up shaft is axially supported.

13. A webbing retractor according to claim 8, wherein said pressing portion is constituted by a disk-like member secured to said take-up shaft concentrically therewith.

14. A webbing retractor according to claim 8, wherein said first urging means is constituted by two spiral springs connected in series.

15. A webbing retractor according to claim 14, wherein said take-up means has urging force stopping means which in a state in which said webbing is applied to said seat occupant of said vehicle, stops the urging force of one of said two spiral springs and causes only the urging force of the other to act on said take-up shaft.

* * * * *